United States Patent [19]

Dinkin et al.

[11] Patent Number: 5,224,205
[45] Date of Patent: Jun. 29, 1993

[54] METHOD OF COMBINING ARCHITECTURALLY DISSIMILAR COMPUTING NETWORKS INTO A SINGLE LOGICAL NETWORK

[75] Inventors: Joel E. Dinkin; Johnathan L. Harter, both of Raleigh; Julie M. Henderson, Durham; Dirk K. Kramer; Michael A. Lerner, both of Raleigh; Haldon J. Sandick, Durham, all of N.C.

[73] Assignee: International Business Machines Corp., Armonk, N.Y.

[21] Appl. No.: 525,574

[22] Filed: May 21, 1990

[51] Int. Cl.$^5$ .............. H04L 12/46; H04L 12/66
[52] U.S. Cl. .............. 395/200; 364/DIG. 1; 364/239; 364/239.9; 364/242.94; 364/260.4; 364/284; 364/284.4
[58] Field of Search .......... 364/200, 900; 395/200; 370/85.13, 84.14

[56] References Cited

U.S. PATENT DOCUMENTS

| | | | |
|---|---|---|---|
| 4,627,052 | 12/1986 | Hoare et al. | 370/85.13 |
| 4,644,468 | 2/1987 | Doster et al. | 395/200 |
| 4,644,496 | 2/1987 | Andrews | 395/800 |
| 4,677,588 | 6/1987 | Benjamin et al. | 395/325 |
| 4,737,953 | 4/1988 | Koch et al. | 370/85.13 |
| 4,754,395 | 6/1988 | Weisshaar et al. | 395/650 |
| 4,827,411 | 5/1989 | Arrowood et al. | 395/375 |
| 4,914,571 | 4/1990 | Baratz et al. | 395/600 |
| 4,914,619 | 4/1990 | Harris et al. | 395/200 |
| 4,947,390 | 8/1990 | Sheehy | 370/85.13 |
| 5,027,350 | 6/1991 | Marshall | 370/85.13 |
| 5,086,426 | 2/1992 | Tsukakoshi et al. | 370/85.13 |
| 5,109,483 | 4/1992 | Baratz et al. | 395/200 |
| 5,111,453 | 5/1992 | Morrow | 370/85.13 |

OTHER PUBLICATIONS

James Martin, "SNA: IBM's Networking Solution", 1987, Chapt 12.
IBM MVS/ESA System Programming Library: "Installation Exits", Dec. 1989, pp. ii-18.

Primary Examiner—Dale M. Shaw
Assistant Examiner—Lance Leonard Barry
Attorney, Agent, or Firm—Jerry W. Herndon

[57] ABSTRACT

A method and arrangement is disclosed for extending a resource search across a gateway node connecting a peer-to-peer network with a subarea network. An interface node is divided into a first section associated with the peer network and a second section associated with the subarea network. In response to a resource search request arriving at one of the sections from the network with which the section is associated, a directory of resources known by the respective section is first searched. If the resource is not found in the directory of the section, the search request is translated into a format compatible with the other network, and the translated search request is transmitted to the other section of the interface node. If the resource is not found among the resources known to the interface node, the resources known by the end nodes served by the interface node in the peer network are next searched. If the resource is not found within these end nodes, the resources known by each of the remaining network and end nodes in the peer network are next searched. If the resource is still not found, a search of the subarea nodes of the second network is initiated.

22 Claims, 15 Drawing Sheets

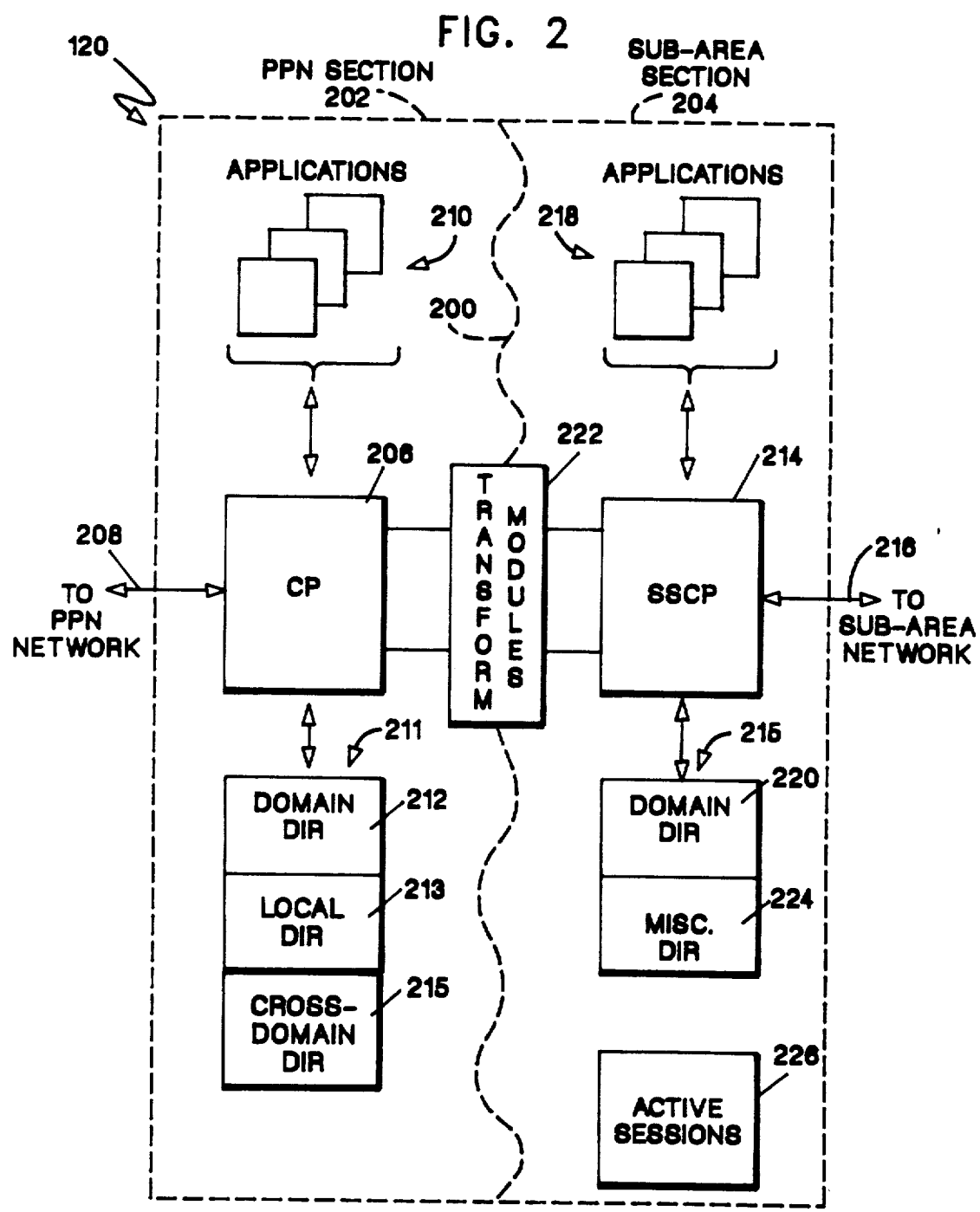

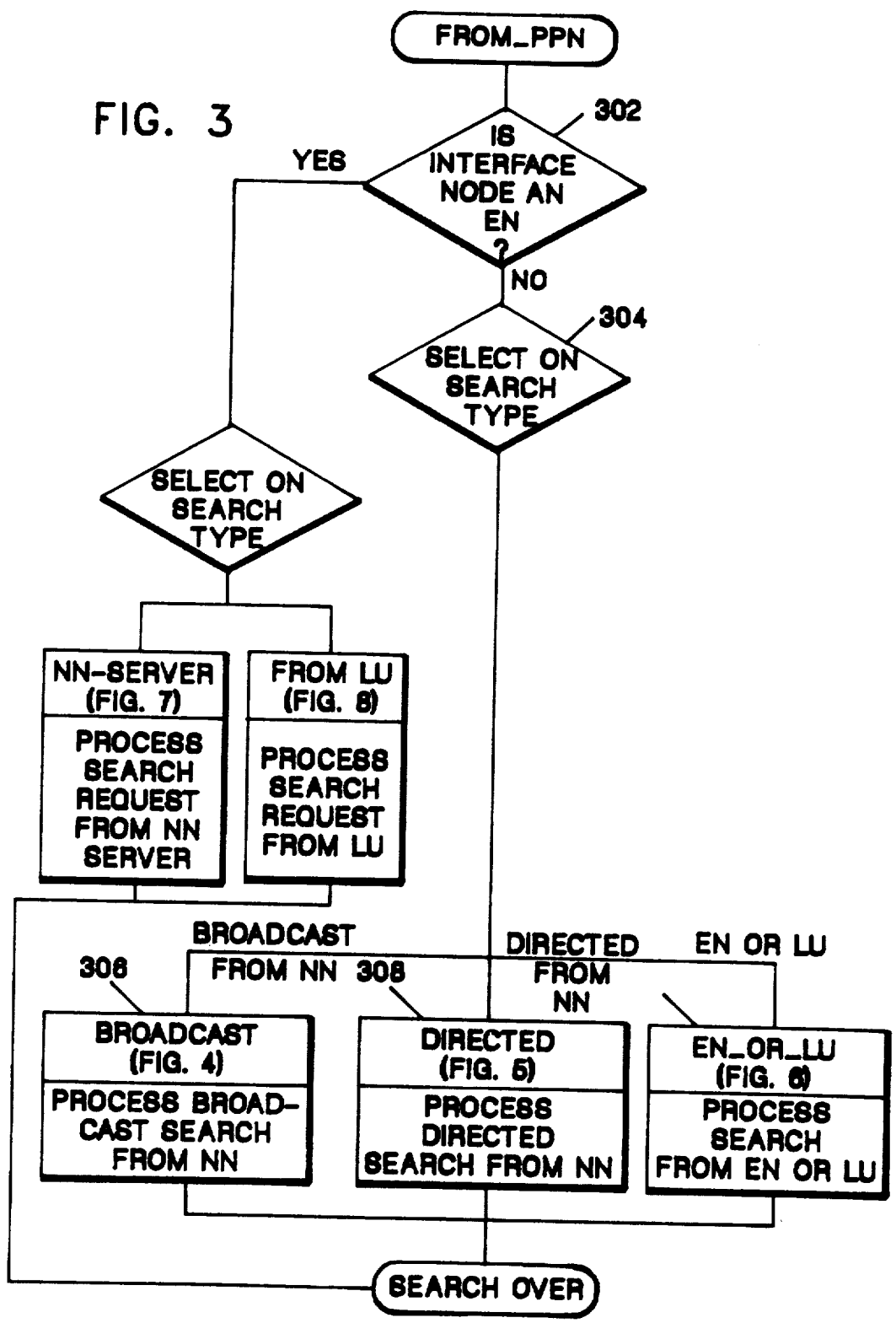

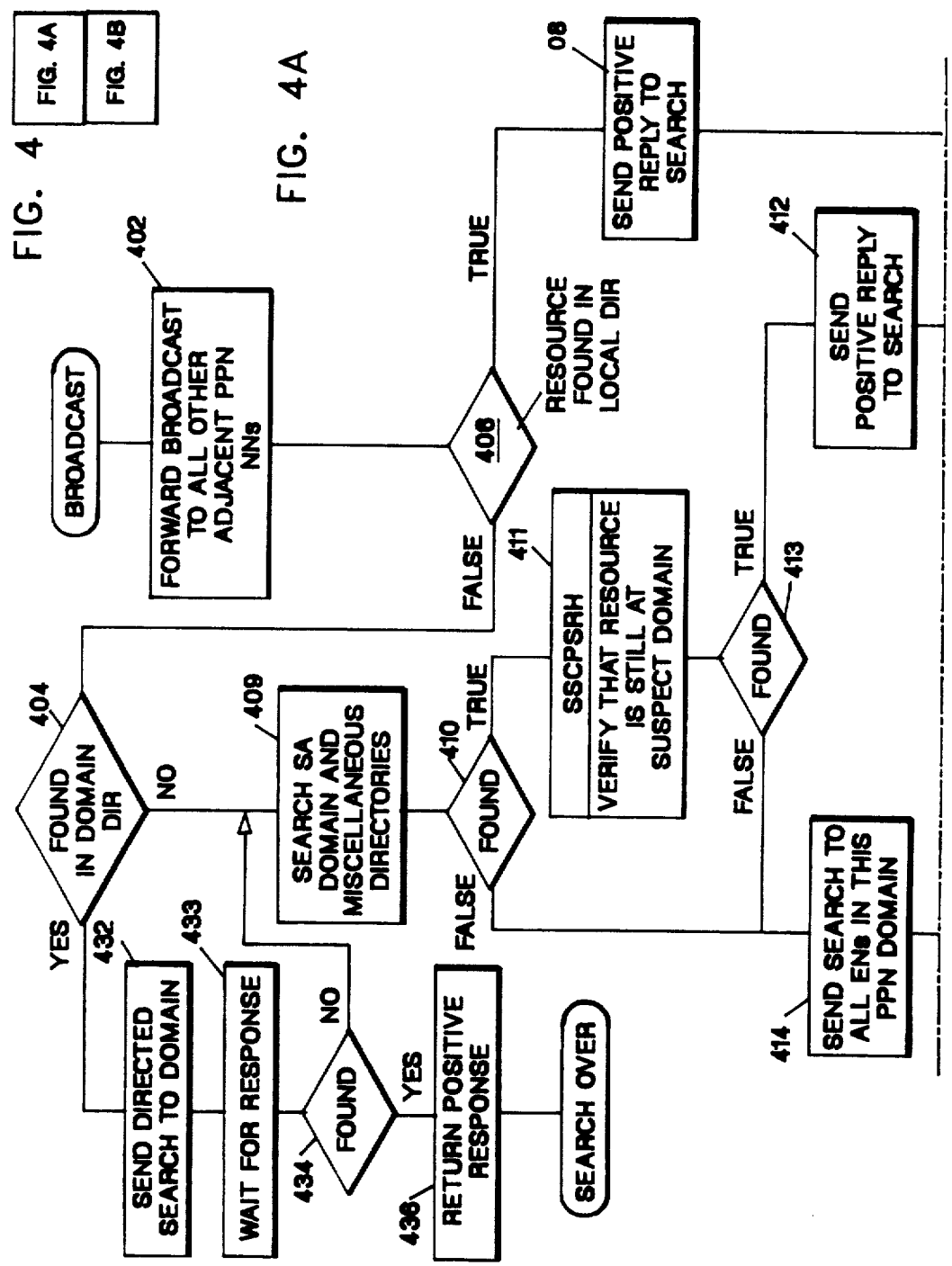

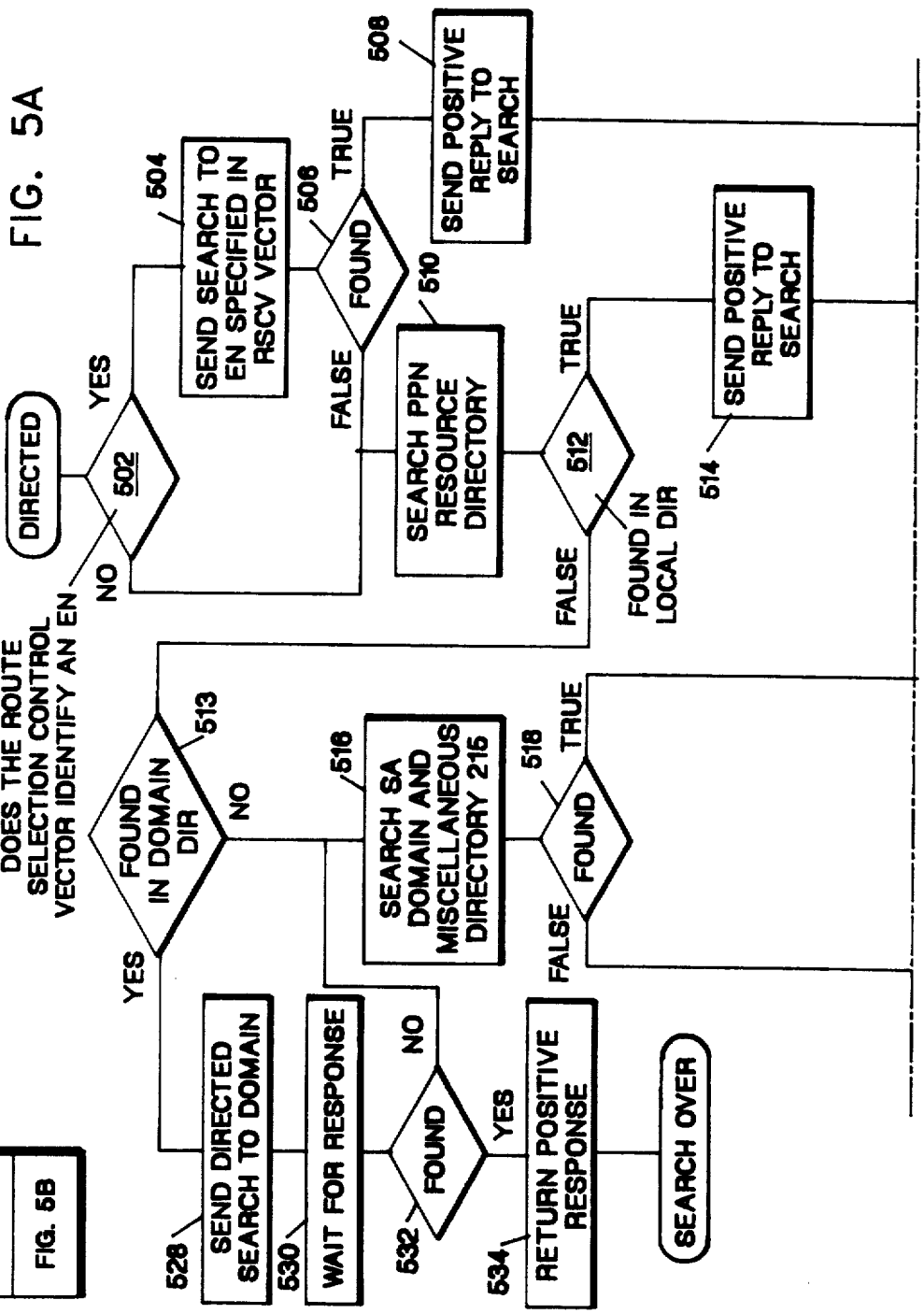

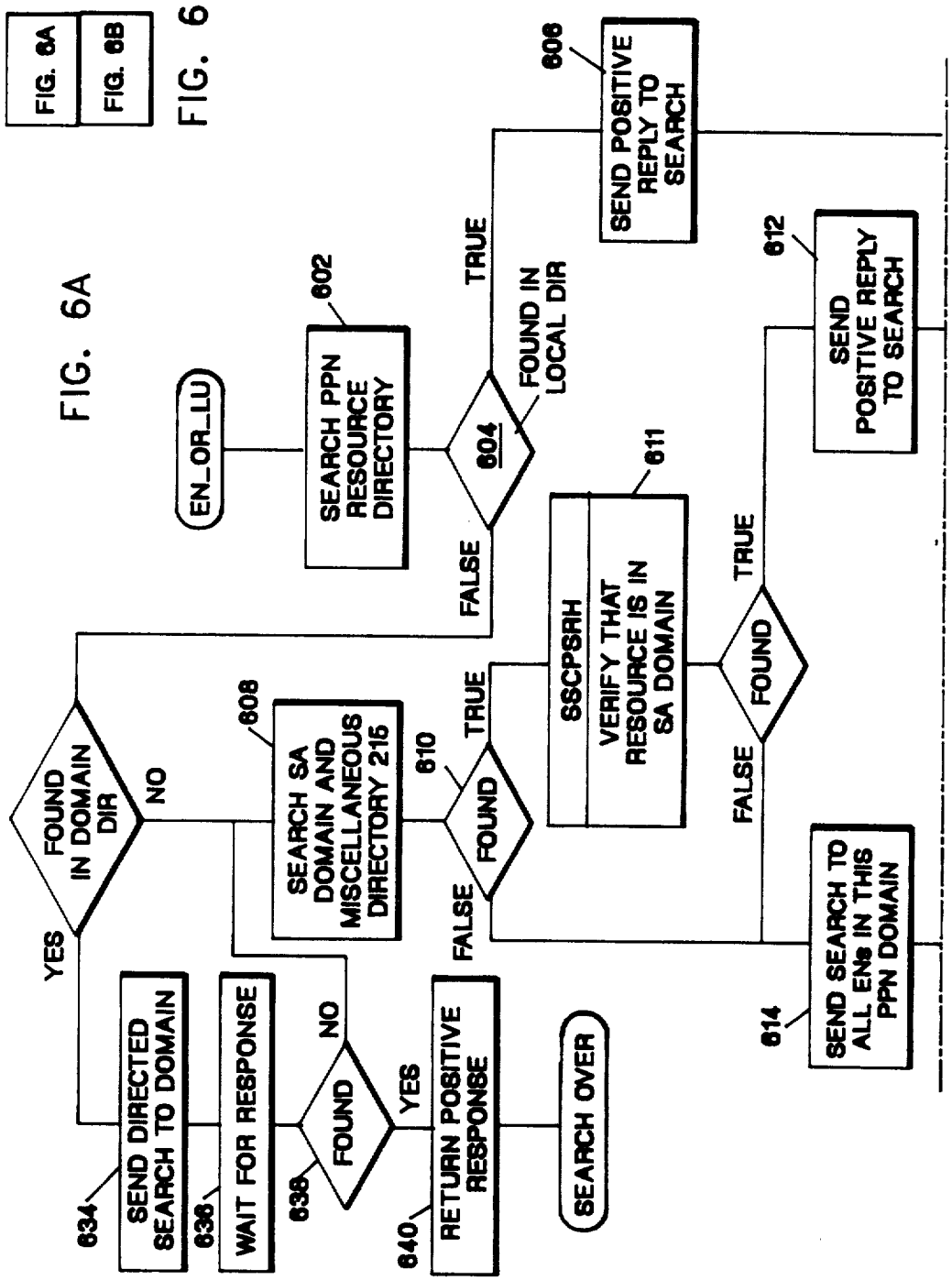

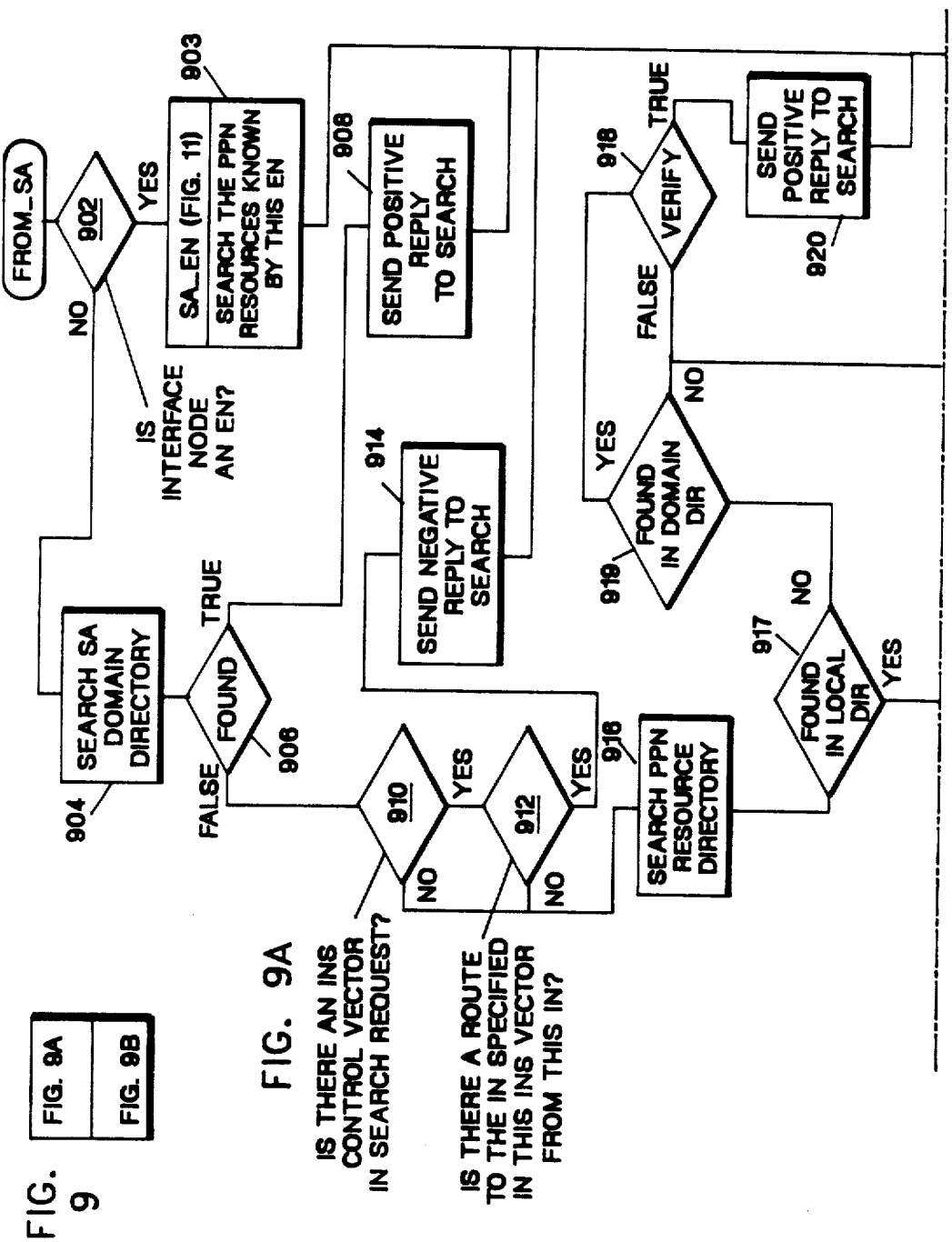

METHOD OF COMBINING ARCHITECTURALLY DISSIMILAR COMPUTING NETWORKS INTO A SINGLE LOGICAL NETWORK

TECHNICAL FIELD

The invention relates generally to resource location in computer networks and particularly to resource location in logical networks formed by combining architecturally dissimilar physical networks.

BACKGROUND OF THE INVENTION

As network technology and topology evolve, some users have a need for the new architectures, while at the same time retaining their established networks for economic and other reasons. For example, some companies have extensive investments in subarea networks. Subarea networks are a mainstay of the System Network Architecture (SNA) and are described in detail in many publications and books, such as "SNA: IBM's Networking Solution", James Martin, Prentice-Hall, 1987. Subarea networks are characterized by a topology in which many subarea domains may be interconnected in many ways and in which a domain typically will comprise a hierarchically structured set of nodes. These nodes typically include a host node (a type 5 node in the SNA definition) controlling a tree of other nodes such as communication controllers (type 4 nodes), cluster controllers (type 2 nodes) and end units (type 2 or 1 nodes).

Many of the companies with present or future subarea networks may also direct some of their growth toward peer-to-peer networks (PPNs). PPNs are characterized by a topologically flat interconnection of network nodes, each of which serve a plurality of end nodes. One such PPN network is described in detail in U.S. Pat. No. 4,914,571, which issued on Apr. 3, 1990 to Baratz et al.

In many cases, there is a great need for companies to combine these architecturally different networks into a single logical network from the users point of view. Heretofore, success has been achieved in interfacing networks of like architecture. This has been accomplished, for example, by performing network name and address translation at interface nodes between the networks to avoid the problems of duplicate resource naming in the separate networks. The problem is generally discussed in Chapter 12 of the aforementioned book by Martin. U.S. Pat. No. 4,677,588, which issued to Benjamin et al on Jun. 30, 1987, discloses the details of a solution to the problem of duplicate resource names in combined networks. In view of the teaching of U.S. Pat. No. 4,677,588, searching of combined architecturally similar networks to locate a resource whose location is unknown to a requesting node presents no severe additional problems, because each of the individual networks are of similar architecture and the search algorithms in the networks are the same. However, when architecturally different networks are combined at an interface node, problems arise in the efficient location of resources in the combined network because of the different architectures and search algorithms. For example, if a search request for a resource that originates in the PPN side of a combined PPN/subarea network is merely broadcast into the subarea side from an interface node, all kinds of network havoc may occur. This may be caused in part by an uncontrolled massive search of all subareas and the attending large amount of resulting network traffic. The problem is exacerbated by the possibility of circuitous loops and other problems if multiple interface nodes interconnect the different physical networks or if multiple PPN and/or subarea networks are combined, rather than one of each. Similar problems can occur for a search originating from the subarea network into the PPN side.

SUMMARY OF THE INVENTION

In view of the foregoing problems of the art, an advance in the technology is obtained in combining architecturally dissimilar networks into a single logical network. The claimed invention covers a method and arrangement of searching for a resource across the two architecturally dissimilar computing networks which are connected by one or more interface nodes. The method and arrangement are tailored to reduce or minimize the effects of a search in both of the two or more physical networks. An interface node is divided into a first section which is associated with a first network and a second section which is associated with a second architecturally different network. In response to a resource search request arriving at one of the sections of the interface node from either the first or second network with which the section is associated, a directory of resources known by the respective section of the interface node is first searched. If the resource is not found in the directory of the section, the search request is translated into a format compatible with the other architecturally dissimilar network, and the translated search request is transmitted to the section of the interface node associated with the other network.

In the preferred embodiment, the first network comprises a plurality of interconnected network nodes, each of which provides network services to its separate group of end nodes. The second network comprises one or more interconnected domains of a subarea network. Each domain may be internally structured as a plurality of hierarchically connected nodes. First, the resources known by both sections of the interface node are searched in response to the resource search request arriving from either the first or the second network. If the resource is not found among the resources known to the interface node, the resources known by the end nodes served by the interface node in the first network are next searched. If the resource is not found within these end nodes, the resources known by each of the remaining network and end nodes in the first network are next searched. If the resource is still not found, a search of the nodes of the second network is initiated.

The searching of the network and end nodes of the first network is accomplished by transmitting a broadcast search request from the interface node to the network nodes in the first network that are adjacent to the interface node. A broadcast search request requests each network node receiving it to search the resources known to it and the end nodes it serves and to broadcast the search to its adjacent network nodes, if necessary.

If the interface node receives a broadcast type of search request from a network node of the first network, it first transmits the broadcast search request to all other network nodes adjacent to it in the first network. It then proceeds with a search of the resources that it knows, i.e., that are listed in its directory. This includes the resources that are listed in its local directory (resources that it owns) and in a domain directory (resources that it serves) for the first network, and a directory for the domain of the second network of which it is a part. Local resources are under the control of the interface node and are therefore positively known to exist. However, it is possible that a resource listed in the domain directory for the first network or the cross-domain directory for the second network may have been moved to another location or may no longer exist. Therefore, the existence of a resource found in either of these directories of the interface node must be verified. This is called a directed search in the first network, which is a search directed explicitly to the node listed in the domain directory. There is no direct equivalent to a directed search in the second subarea network. If the resource is not found in the local directory, or if the search for a resource listed in a domain directory is not verified, then the interface node proceeds with a search of the end nodes in the first network that it serves. If the search is still unsuccessful, the interface node waits for a response from each of the adjacent network nodes to the broadcast search request it transmitted when it first received the broadcast search request. If any response is positive, meaning that the target resource has been located, the interface node returns the positive response to the node from which it received the broadcast request. Only if all responses from the adjacent network nodes are negative is a search of the second network initiated. This is done to minimize the effects of a massive search in the second subarea network. To further minimize the effects of a search in the second network, search requests are sequentially transmitted from the interface node to each subarea domain until the resource is found, rather than broadcasting requests to all subarea domains at the same time.

The interface node may also receive a directed search request from a network node of the first network. A directed search is directed to a specific node for which there is some reason to believe that it contains the target resource. If a directed search request identifying an end node is received by the interface node, the interface node sends a search request to the identified end node. If this search is unsuccessful, the interface node proceeds to search its known resources, followed by the initiation of a full search of the first network and then the second network, as required and summarized above.

DESCRIPTION OF THE DRAWING

In the drawing,

FIG. 2 expands on the relevant structural details of an interface node;

FIG. 3 shows the initial steps performed when a search request is received at an interface node from a source in the PPN network;

FIG. 4, which comprises FIG. 4A and FIG. 4B, shows the method steps for a broadcast search request received at the interface node from a source in the PPN network;

FIG. 5, which comprises FIG. 5A and FIG. 5B, shows the method steps for a directed search request received at the interface node from a source in the PPN network;

FIG. 6, which comprises FIG. 6A and FIG. 6B, shows the method steps for a search request received at the interface node from an end node within the PPN network which is served by the interface node or from a logical unit (LU) contained within the interface node;

FIG. 9, which comprises FIG. 9A and FIG. 9B, shows the method steps for a search request received at the interface node from a source in the subarea network;

DETAILED DESCRIPTION

Figure 1:
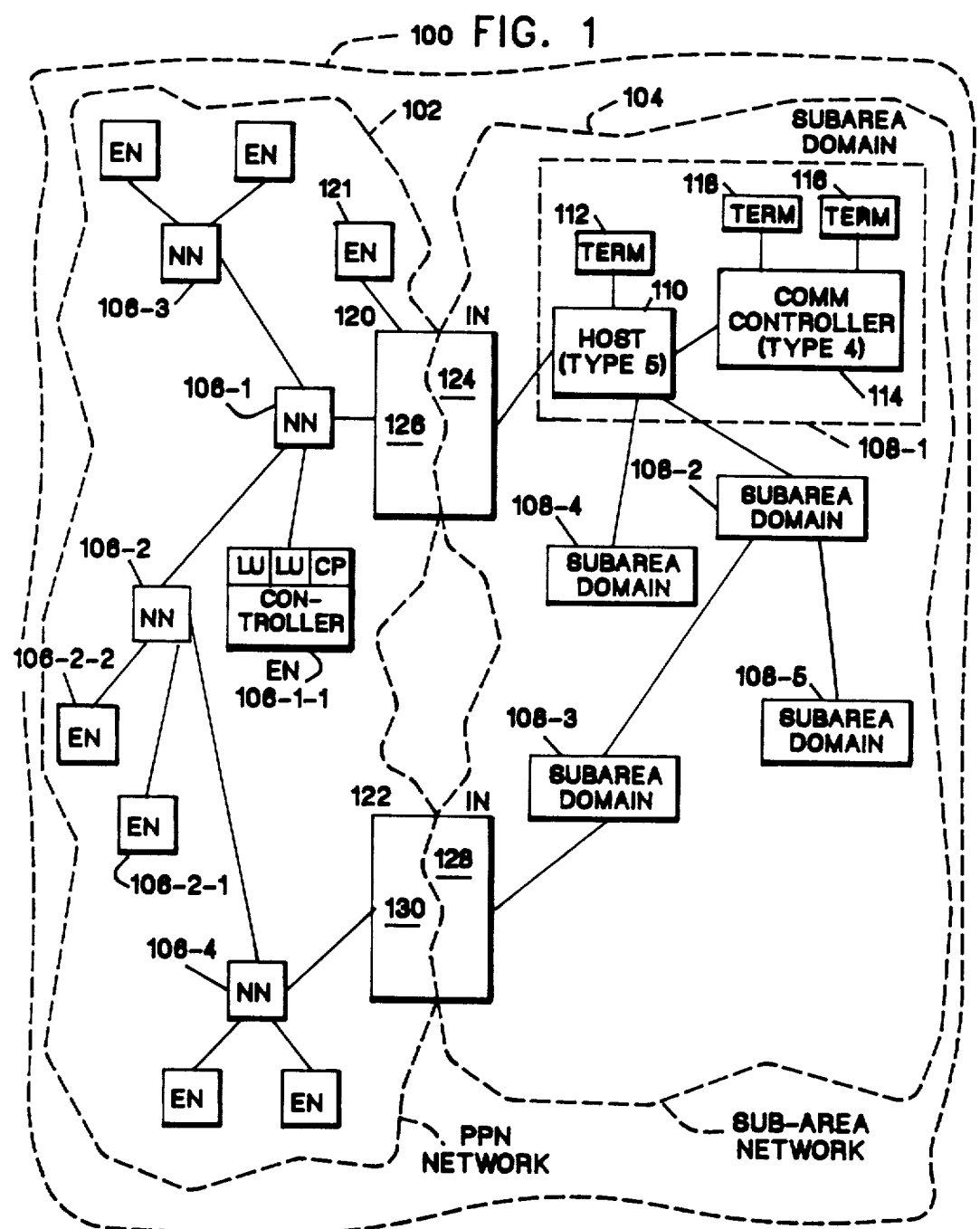
FIG. 1 shows the general architecture of a PPN and subarea network, combined at two interface nodes.

FIG. 1 illustrates the topology of a single logical and illustrative network 100 which is formed by interconnecting an PPN network 102 with a subarea network 104. The PPN network and its operation pertaining to the locating of resources in the PPN network is fully disclosed in U.S. Pat. No. 4,914,571, which issued on Apr. 3, 1990 to Baratz et al. The disclosure of this patent is incorporated in full herein. For convenience, however, the structure of a PPN network will be briefly described here. Such a network comprises a plurality of network nodes (NN), such as 106-1 through 106-4. Each of the NN's may, in turn, provide network services for one or more end nodes (EN) to which it is connected. In this illustrative PPN network 102, NN 106-1 is assumed to serve a single EN 106-1-1. Similarly, NN 106-2 is assumed to serve two EN's 106-2-1 and 106-2-2. By network services, what is meant is the provision for and control of message traffic between the ENs and the remainder of the network. ENs may be connected to more than one NN node. However, only one NN provides network services for any given EN and it is called the NN server for that EN. NNs may be virtually any type of device capable of providing intelligent operation. This includes computing devices, communication controllers, etc. ENs may be virtually any device capable of network communication, including both intelligent devices and so-called "dumb" terminals. The combination of a network node and the end nodes that it serves is called a PPN domain.

The topology and resources of a PPN network are maintained in a database distributed across the NN's and the EN's of the network. The database and method of maintaining it are fully described in U.S. patent application 4,827,411, entitled METHOD OF MAINTAINING A TOPOLOGY DATABASE, which issued to Arrowood et al on Apr. 25, 1989. The contents of this patent is hereby incorporated by reference into this disclosure.

A subarea network such as 104 is comprised of one or more interconnected subarea domains. Such networks are described in detail in the aforementioned Prentice-Hall book by J. Martin. Briefly, a subarea domain is headed by a type 5 SNA node. A type 5 node contains a System Services Control Program (SSCP) that manages all the resources contained in the domain. Such resources include node devices, connecting links, and software resources. A subarea domain comprises one or more subareas. A subarea is headed by a type 5 or a type 4 node as defined by the System Network Architecture (SNA) definitions and includes the resources the type 5 or 4 node owns or controls, including the local peripheral type 2 and type 1 nodes attached to it. Thus, in FIG. 1 the entity designated as 108-1 in subarea network 104 constitutes a subarea domain and includes two subareas, one including the host 110 and terminal 112, the other including the type 4 communications controller 114 and the terminals 116 and 118.

The two architecturally dissimilar networks 102 and 104 may be interconnected at one or more interface nodes (IN). Two IN's 120 and 122 are shown in FIG. 1. Each IN is partitioned into two sections, one section (124 and 128) associated with the subarea side of the network 100 and another (126 and 130) associated with the PPN side of network 100. An interface node, such as 120, its two sections and software transform modules relevant to the invention interconnecting the two sections are shown in FIG. 2. The IN is logically partitioned by an imaginary line 200 which divides the node into the PPN section and the subarea section. Both the PPN section 202 and the subarea section 204 of the IN retain all the characteristics of the physical network (102 or 104) of which it is a part. For example, every NN of a PPN network contains control point (CP) software that provides control functions, such as LU (logical unit) to LU session initiation and termination. A session is an active logical communication path between two entities. SNA defines LU's as logical, not physical, entities through which users can gain access to a network. Both NNs and ENs have a control point (CP) software module 206. The CP 206 communicates with the remainder of the PPN network via sessions over connections 208; it further internally communicates with internal resources, such as application programs 210, and with a resource directory 211. In the case of an EN, the CP communicates only with its serving NN. The directory 211 is partitioned into a domain directory 212, a local directory 213 and a cross-domain directory 215. The local directory lists the resources owned and controlled directly by the PPN section of the interface node. These would include the application programs 210, for example. The domain directory lists the resources that are not owned by the PPN section, but are within its domain. Such resources would include any end nodes it serves and possibly other resources, such as applications, that reside in the end nodes that it has learned about, perhaps by system definitions (sysdef) at network startup time or through earlier searches. The cross domain directory 215 lists resources in other PNN domains that have been sysdef'ed or otherwise obtained.

Similarly, the subarea section 204 of an interface node contains a System Services Control Software module 214 which communicates with the remainder of the subarea network with which it is associated via communications links 216. The SSCP provides communications within its own subarea domain as well as with other domains to which it is connected. It also communicates with resources internal to the section 204, such as application programs 218 and a directory 215. This directory 215 is partitioned, in a fashion similar to 211 of the PNN section 202, into a domain directory 220 and what is referred to here as a miscellaneous directory 224. The miscellaneous directory 224 would include resources outside of the subarea domain of which the IN is a part of which the IN has learned by sysdef's or otherwise.

The PPN section of an interface node can be implemented as an end node (EN), rather than as a NN. In such a case, directory 211 would consist only of the local resource directory 212, i.e., domain directory 213 and cross-domain directory 215 would either not exist or be empty. Similarly, if the subarea section 204 is realized as an end node, it will have no connections 216 to other portions of the subarea network, other than to nodes that it serves.

Figure 11:
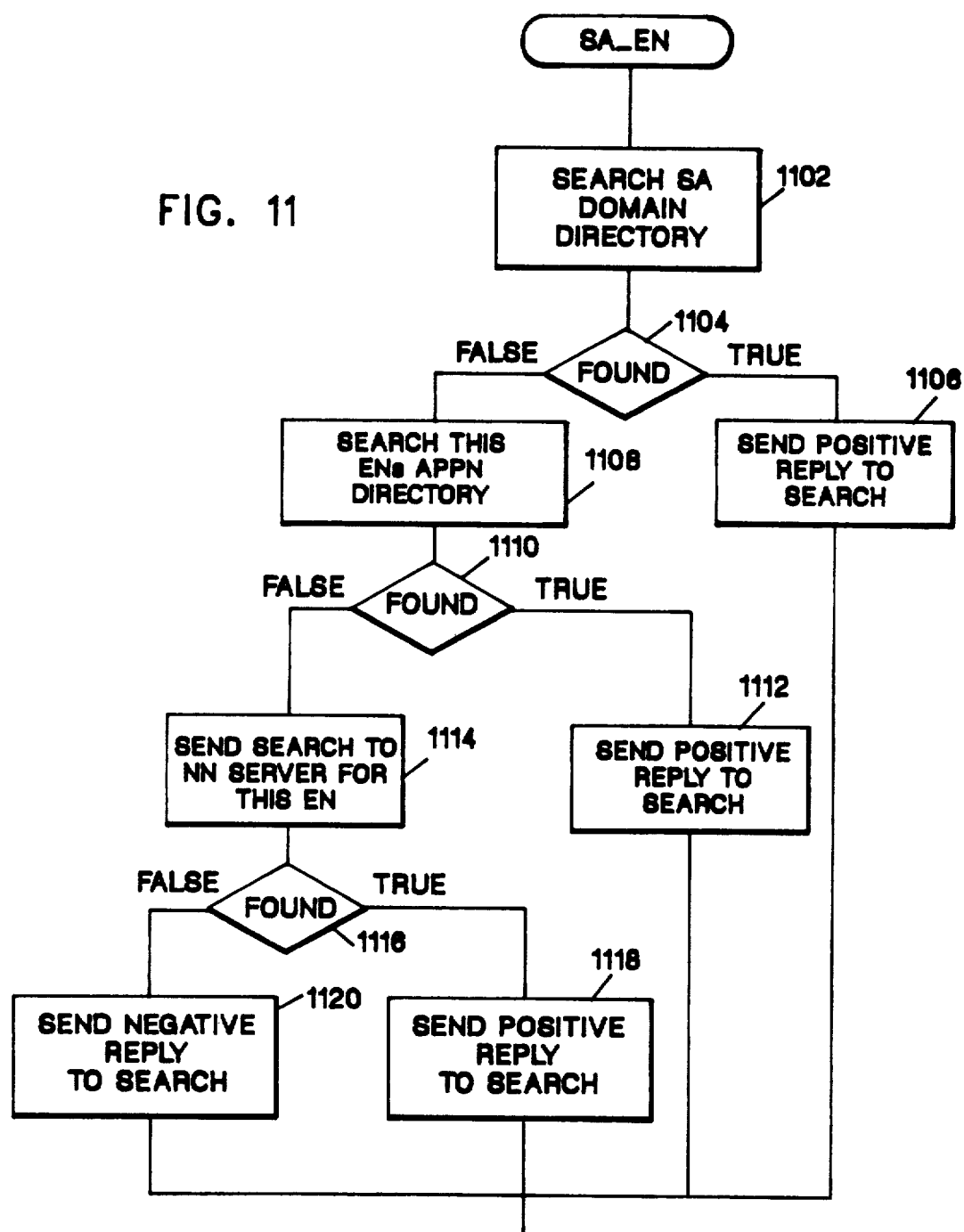
FIG. 11 shows a subroutine SA_EN which is called for the case in which the interface node is implemented as an end node (EN) and a search request is received from a source in the subarea network.
Figure 12:
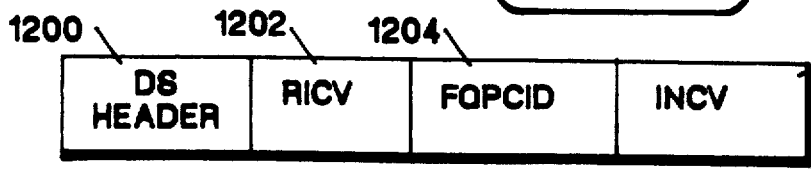
FIG. 12 shows the illustrative format of a search request used in the subarea network.

Conceptually residing on the imaginary dividing line 200 between the two sections of the IN are a number of transform modules, shown in FIG. 2 as a single block 222, that provide format translation services for the search commands that are passed between the physical networks 102 and 104 via the interface node. The illustrative formats of the search commands in network 102 are shown in FIGS. 2 through 12 of the U.S. Pat. No. 4,914,571. The format of a search command in network 104 is shown in FIG. 12 of this disclosure. In FIG. 12, field 1200 contains a header whose value identifies this message as a search request. A field 1202 contains a resource identifier control vector (RICV) which identifies the resource to be located. A field 1204 (FQPCID) contains a unique value that distinguishes this search from all others. An optional field 1206 contains an interexchange node support control vector (INCV) if it is present. This field is used to identify an interface node through which this search request originally passed from network 102 to network 104. As will be seen, this field is used to prevent circular looping of a search between the dissimilar networks via different interface nodes.

FIGS. 3 through 8 disclose the illustrative method steps involved in searching for a resource when a search request arrives at an interface node from the PPN side of the network 100. Subsequent flowcharts describe the steps relating to a request arriving from the subarea side of the network 100. Keep in mind that the source of the request arriving at the IN is not necessarily the source of the original search request. The original request may have come from virtually anywhere, including any node of networks 102 and 104 or from other physical PPN or subarea networks that might also be combined into the logical network 100 of FIG. 1 by means of the techniques described herein.

Figure 4B:
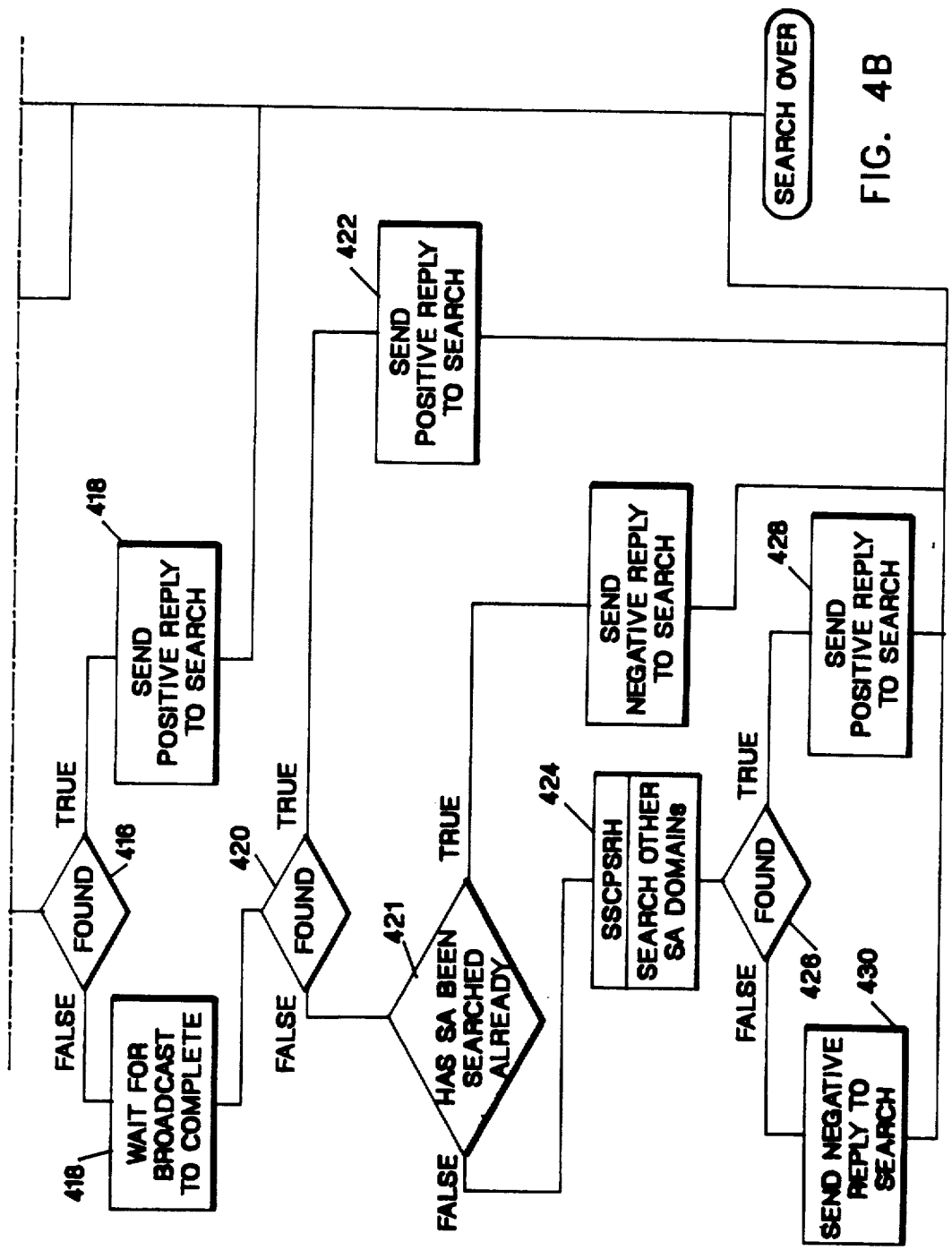

The method begins at the program label FROM_PPN in response to a search request arriving at PPN section 202. (In U.S. Pat. No. 4,914,571, a search request is also referred to as a LOCATE request or message). First, it is determined at step 302 if this interface node is implemented as a NN or as an EN. Assuming that this node is a NN, step 304 next determines from the arriving search request what type of request it is. As discussed in the U.S. Pat. No. 4,914,571, the request search may be a broadcast search, a directed search, or a search from an EN served by the IN or a LU at the IN. A broadcast search is one sent by a NN to all of the other NN's of a PPN network to which it is connected by a session, i.e., an adjacent node. A directed search is a limited search sent to a specific node because the sender believes that the resource resides there. The kind of search performed by the interface node and how the search is propagated forward, both into the PPN network and the subarea network, depends on the type of request received by the IN. If the search request received is a broadcast search, a subroutine BROADCAST in FIG. 4 is executed. Similarly, a subroutine DIRECTED (FIG. 5) or EN_OR_LU (FIG. 6) is executed for a directed request or a request from an EN or LU served by the PPN section 202, respectively.

As discussed in U.S. Pat. No. 4,827,411, the PPN section 202 of an IN maintains a directory of all NN's in the network 102. NNs which are connected to an interface node by a session can be derived from this database. With reference to FIG. 4A, upon receipt of a broadcast search, step 402 consults this directory and propagates the received broadcast search outward on links such as 208 to these NN's that are adjacent to the IN. Each NN receiving this broadcast search from the IN searches a directory of its local resources and, if necessary, the resources of the EN's it serves. It is possible that these NN's may have already received the same broadcast request from one or more of its adjacent nodes. To avoid resulting redundant searches, each broadcast search request contains a unique search identifier called a fully-qualified procedure correlation identifier (FQPCID) that is discussed in U.S. Pat. No. 4,914,571. The FQPCID contains the identity of the original node that requested a resource search and a sequence number unique to that node. Thus, the full FQPCID is unique for each resource search within a network. Any node receiving a search request with a FQPCID that it has already received merely returns a negative reply, in this case to the IN.

While the broadcast search requests from the IN are being processed by the remainder of the PPN network 102, the IN proceeds with a search of its own resources. At step 406, all resources owned by the PPN section 202 are searched from the local directory 213. If the resource is found locally, a positive response is returned at step 408 to the source of the search request message that was received at the IN. A positive response includes the full address of the located resource. If the resource is not found locally, a search request of the domain directory 212 of the IN node is performed at step 404. If the resource is found in the IN domain, it becomes necessary to verify that the resource is still there. Step 432 sends a directed search request to the domain EN that is believed to own the resource. A response is awaited at step 432 and if it is positive at step 434, a positive response is returned at step 436. If the search is negative at either steps 404 or 434, a search of the directory of the subarea section 204 of this IN is generated and propagated to the subarea section at step 409. The cross-domain directory 215 of the PPN section is not searched, because the broadcast search received by the IN is propagated to these domains from other NNs, as discussed in U.S. Pat. No. 4,914,571.

The subarea section directory search request at step 409 is generated by CP 206 and transmitted via the transform modules 222, where it is converted into the appropriate format for a subarea network. For the time being, this subarea search is limited to the section 204 resources that the IN SSCP 214 owns or otherwise knows about in its directory 215. In other words, the subarea search will not be extended into the remainder of the subarea network 104 at this time. This is done because the IN has no way to limit or control the extent of a search in a subarea network, once it has been initiated. Since the extent of such a full subarea search can be quite large, it is only initiated as a last resort, as will be seen, or if the results of the search at step 409 suggest that the resource is located in the subarea network.

CP 206 waits for a response to the IN subarea directory search at step 410. The response from section 204 is also returned via the transform modules 222, which places it in proper format for the PPN network. When the response is received, if it is positive, CP 206 calls a subroutine SSCPSRH at step 411 to verify that the resource is actually present. Again, this is done by generating a message request and transmitting it via the transform modules 222 to section 204, where SSCPSRH resides. SSCPSRH is discussed in detail below with respect to FIG. 10. For the time being, if the verification is positive at step 413, the search is ended at step 412. However, if the verification is negative at 413 or if the IN subarea directory search at step 410 is negative, then CP 206 extends its search to all of the EN's in the domain served by the PPN section 202. This is accomplished at step 414. For the illustrative network of FIG. 1, this includes only one EN 121. However, if other EN's were included in the domain of PPN section 202, search requests would illustratively be sent to these EN's as well. Such requests would be sent in parallel, although it is recognized that serial requests could be used as well. CP 206 waits for responses from all the EN's of its domain at 416. As soon as a positive response, if any, is received, it returns a positive response at step 418.

If all of the local domain EN's return a negative response at step 416, CP 206 waits at step 418 for the arrival of the results of the broadcast search sent out at step 402. This is done in order not to prematurely initiate a further search of the subarea side of the network, if at all possible. Thus, at step 420, as soon as a positive response, if any, is received from a NN as a result of the PPN broadcast search, CP 206 returns a positive response at 422. However, if the broadcast completes at step 420 (all NNs to which the broadcast search was sent have responded) and no positive response was received, CP 206 initiates at step 424 an extended search of the subarea network. Before this is done, however, step 421 determines if a full subarea network 104 search has already been performed by subroutine SSCPSCR at step 411. As will be discussed below, SSCPSRH sequentially searches all of the subarea domains with which section 204 is able to communicate until the resource is located or the subarea domains are exhausted. Subroutine SSCPSRH is called at 424 if it has not already been called. The results of the subarea search are returned from the subarea side to CP 206. A positive response is returned to the source of the broadcast request at step 428 if a positive response is received from the subarea network. If a negative response is received at step 426, CP 206 returns a negative response at step 430 to the source of its search, thus ending the search of the PPN and the subarea networks.

Figure 10:
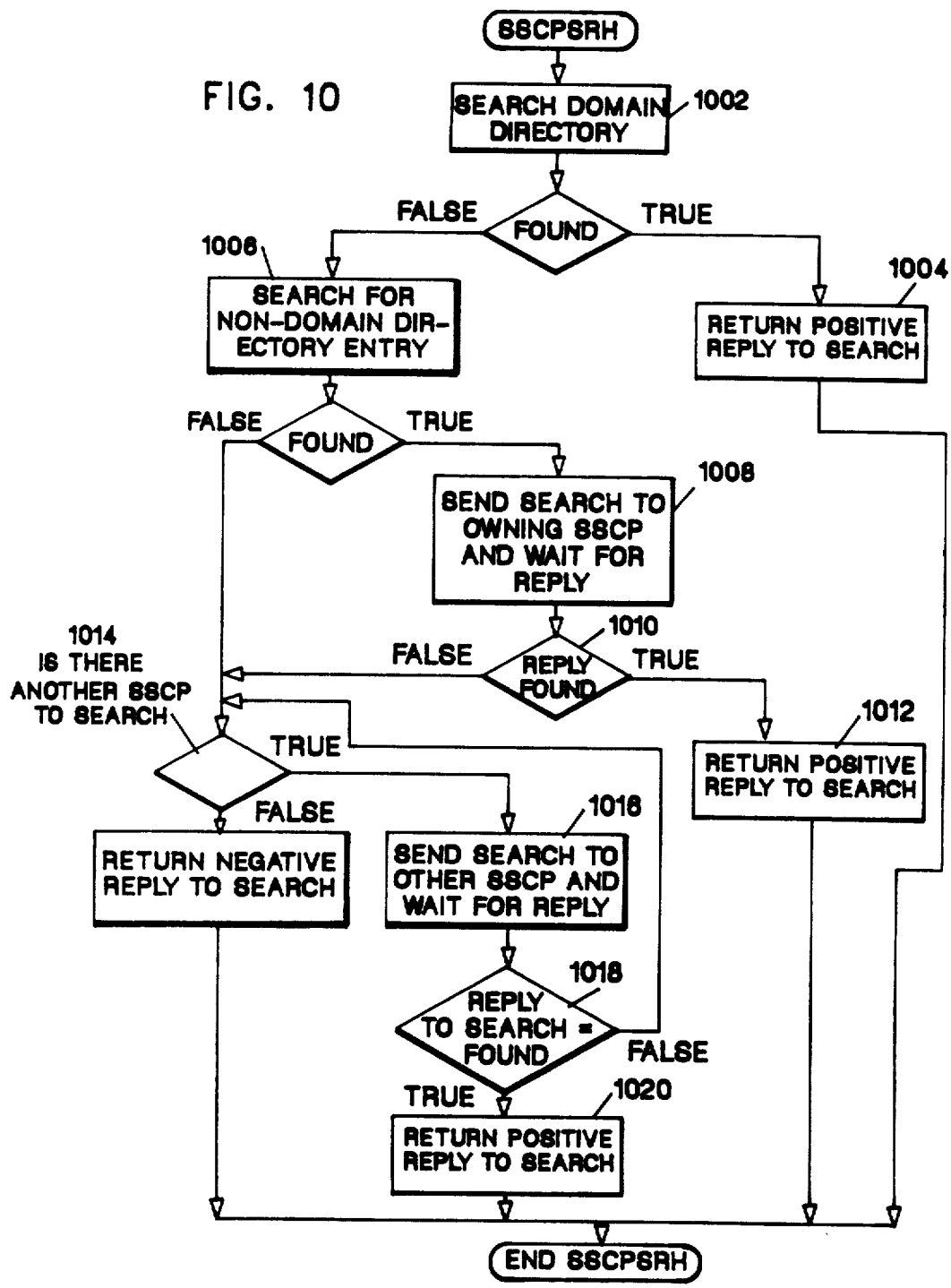
FIG. 10 shows a subroutine SSCPSRH which is used to search each domain of a subarea network.

The subroutine SSCPSRH in FIG. 10 that directs the extended search of subarea network 104 is now discussed. Step 1002 searches the domain directory 220 of the SA side of the IN. Step 1004 returns a positive response if the resource is found in the domain. If the resource is not found, step 1006 then searches directory 224 for that contains information about the location of resources in other subarea domains of which SSCP 214 may have knowledge. Such information can be the result of system definitions that are entered by a system administrator or they may be dynamic entries that are automatically stored as a result of other searches as resources are located. If an entry for the target resource is found, step 1008 sends a search request to the SSCP of the identified subarea domain to verify the accuracy of the information it has stored. Verification is necessary because a resource may have moved to a new location, often by an action of a system administrator. If the verification is positive at step 1010, then step 1012 returns a positive response.

If the resource is still not found or if the response from the SSCP of the target subarea domain in step 1008 is negative, subroutine SSCPSRH next begins to search all other subarea domains to which it has an active session. It uses table 226 shown in FIG. 2 to do this. Table 226 contains an entry for each SSCP that has an active session with SSCP 214. The table is initialized at the time the network is brought on-line and maintained thereafter as sessions are established and terminated. Step 1014 determines if there is a remaining SSCP in table 226 that has not yet been searched. If so, step 1016 sends a search request to that SSCP. If the SSCP returns a positive response to the search request, subroutine SSCPSRH generates and returns a positive response at steps 1018 and 1020. Otherwise, table 226 is interrogated again at step 1014 for the next SSCP, if any, remaining to be searched.

Figure 5B:
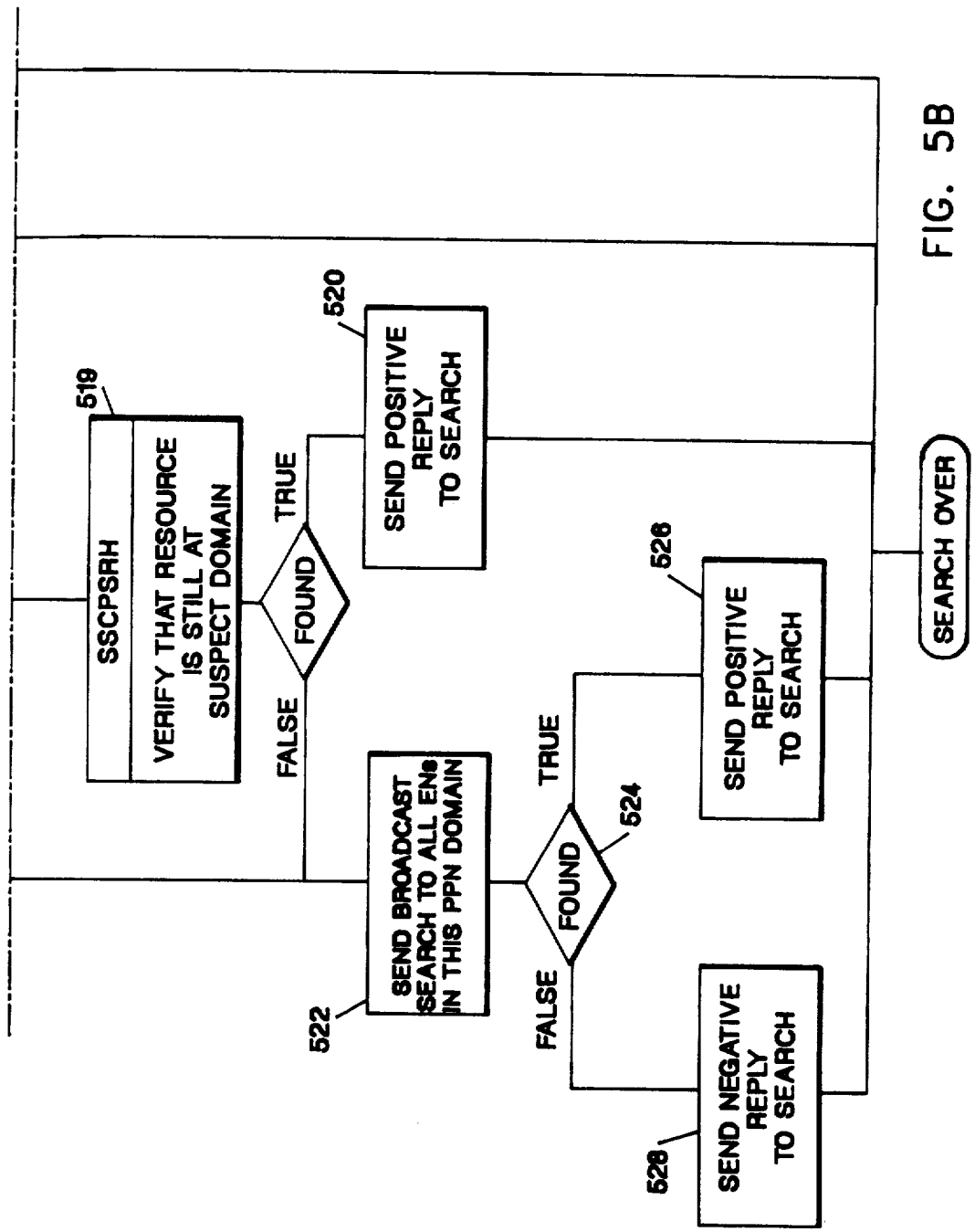

With reference again to FIG. 3, subroutine DIRECTED is executed at step 308 if a directed search request is received by an IN that is also a NN. Subroutine DIRECTED is shown in FIG. 5. As explained in U.S. Pat. No. 4,914,571, a directed search is a search limited in scope to a node that is believed to contain the target resource. Its purpose is to minimize the search activity in a network when there is some reason to suspect that a given node may contain the desired resource. As shown in FIGS. 4 and 10 of U.S. Pat. No. 4,914,571, a directed search request contains a Route Selection Control Vector (RSCV), which specifies a network path to a directed node. FIG. 11 of the patent discloses a Network Name Control Vector (NNCV), which contains the name of the node and the type (NN or EN) of the node. Step 502 interrogates these vectors to determine if the target of the directed search is an EN. In the event that it is, step 504 sends the search request only to the indicated EN and waits for a reply at step 506 before proceeding further with the search. A positive response to the directed EN search results in the return of a positive response at step 508, thus ending the IN search. If the directed node target is not an EN or if the result of the EN directed search is negative, then step 510 initiates a search of the resources owned or served by PPN section 202, as contained in the IN local and domain directories 213 and 212. If the resource is found in the local directory 213 (step 512), a positive response is returned at step 514. If the resource is found in the domain directory 212 (step 513), a directed search is sent (step 528) to the identified EN to verify that the resource is still present in the EN. If the verify fails or if the resource is not found in the domain directory 212, the search is continued at step 516, where a message is generated and transmitted to the subarea section 204 of the IN to cause a search of the resources listed in the domain and miscellaneous directories 215 of this subarea section. Step 519 verifies the existence of the resource (subroutine SSCPSRH) if SSCP 214 returns a positive response. Otherwise, at step 522, a broadcast search command is transmitted to all EN's located in the PPN domain of the IN. Step 524 waits for the responses from the EN's. A positive response is immediately returned at step 526 in response to a positive response from one of the EN's. If all EN's return negative responses, a negative response is returned at step 528. This ends the directed search. If the directed search failed to locate the resource, a broadcast search in the PPN network 102 may follow from the NN that sent the directed search request to the IN, according to the teaching of U.S. Pat. No. 4,914,571.

Figure 6B:
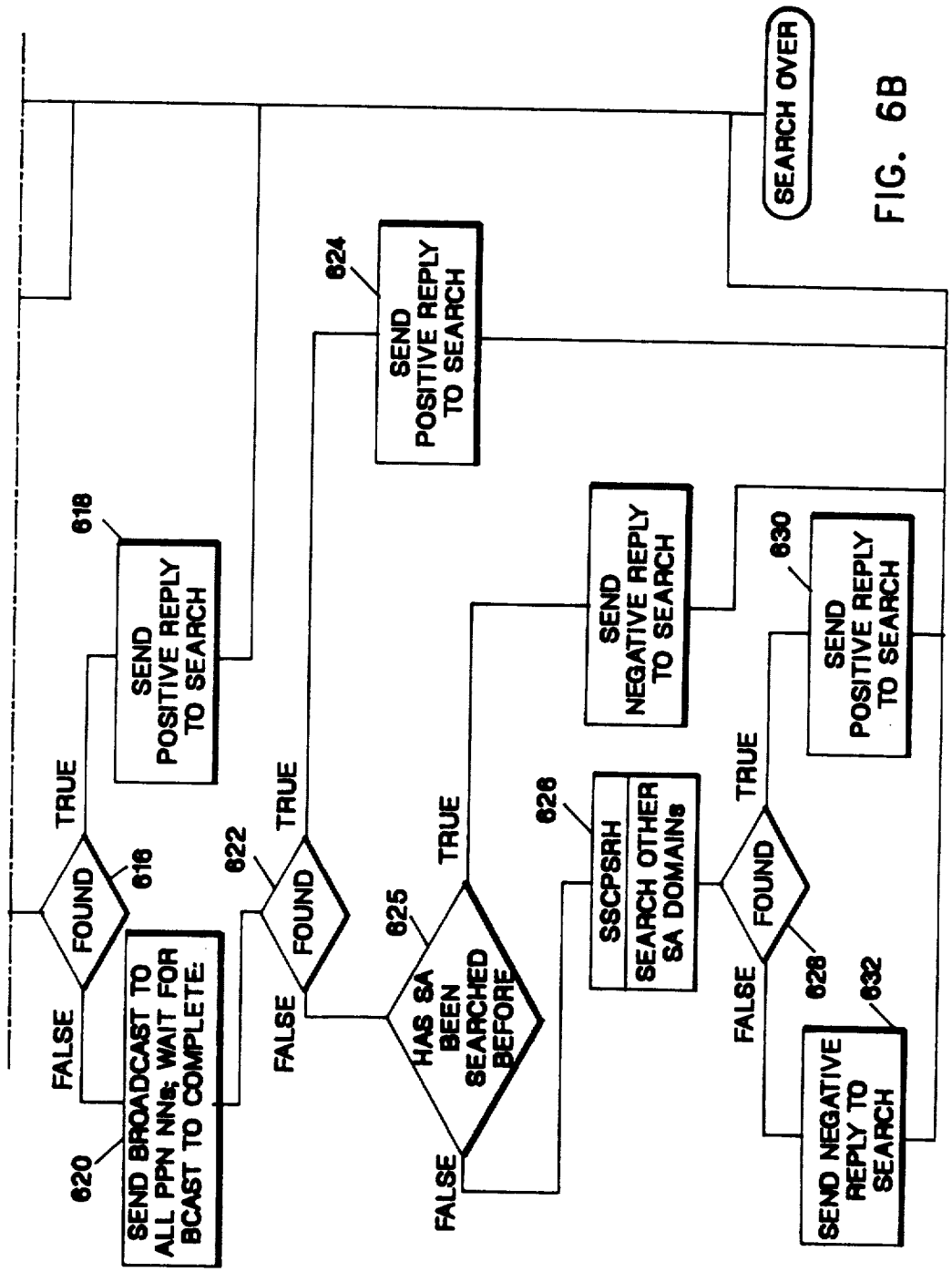
Figure 7:
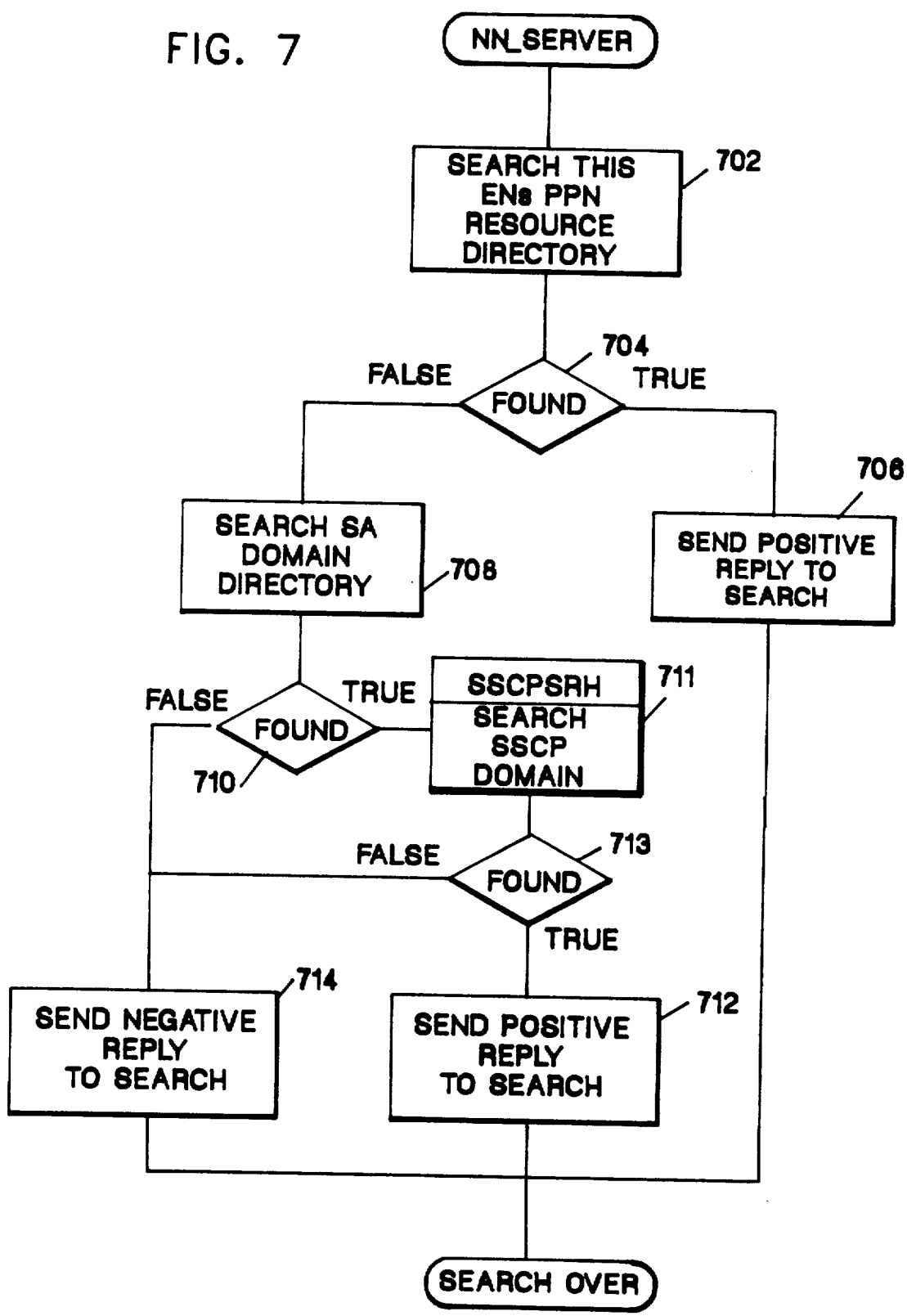
FIG. 7 shows the method steps for the case in which the interface node is implemented as an end node (EN) and a search request is received at the interface node from its network node server.

If the original search request received at FIG. 3 originated from an EN served by the IN or from a LU located in the IN, then the subroutine EN_OR_LU shown in FIG. 6 is executed. This subroutine first searches the resources owned or served by the IN as listed in the local and domain directories 213 and 212. If the resource is found in directory 213 (step 604), a positive response is returned at step 606. If the resource is found in domain directory 212, its presence in the indicated EN is verified at steps 634, 636, 638 and 640. Otherwise, the search is extended at step 608 to the subarea section 204. This is accomplished, as before, by formulating an appropriate search message and transmitting it via the transform modules 222 to SSCP 214. SSCP 214 performs the search and returns its response via the transform modules to PPN section 202. This response is evaluated at step 610 and, if positive, a positive response is returned at step 612.

If the response from the subarea section is positive, the existence of the resource is verified at step 611 (subroutine SSCPSRH) in the same as discussed above. If the response from the subarea section is negative, the search is extended at step 614 to all EN's served by PPN section 202. Steps 616 and 618 immediately return a positive response if any one of the EN's contains the resource. However, if the resource is not found by the EN's, the search is extended at step 620 to other PPN NN's adjacent to the IN by transmitting BROADCAST search requests. Step 622 waits for a response from all of the adjacent NN's before continuing. In other words, it waits for the broadcast search to be completed in the PPN network. This is to insure that the subarea network 104 is not searched, if at all possible. When all of the NN's have responded at step 622, if any one of them is positive, a positive response is returned at step 624. If the resource is still not found in the PPN network, then a full search of the subarea network 104 is initiated at step 626 (subroutine SSCPSRH), unless step 625 determines that subroutine SSCPSRH was already been executed at step 611.

Figure 8:
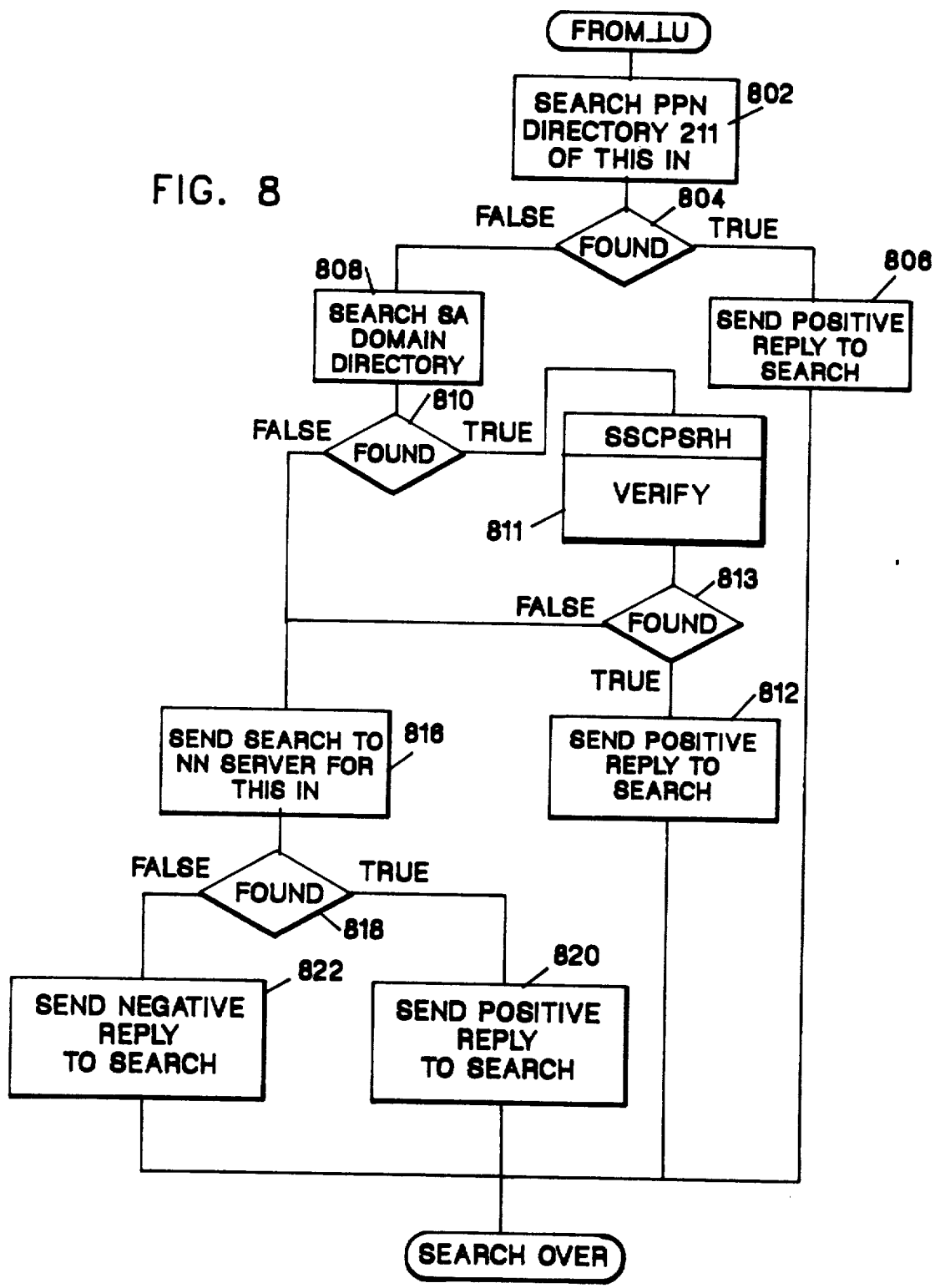
FIG. 8 shows the method steps for the case in which the interface node is implemented as an end node (EN) and a search request is generated by an LU within the interface node.

The search algorithm is now described that is executed when section 202 of the IN is implemented as an EN. It is recalled that step 302 determines if the IN is an EN immediately upon receiving a search request from the PPN side of the network. If this is the case, subroutine NN_SERVER in FIG. 7 or FROM_LU in FIG. 8 is called if the IN search originated from a NN or from a LU in the IN, respectively. The initial steps of both of these subroutines are identical. First, the resource directory 211 is searched. Since this is an EN, the domain and cross domain directories are nonexistent or empty. If the resource is not found in the directory 211, the directory 215 of the subarea section 204 is searched (steps 708 and 808) by transmitting a message across the transform modules 222. Verification of a positive response from the subarea section 204 is not necessary. This is because the IN is implemented as an EN, meaning that section 204 can have no sessions with other subarea domains. Nevertheless, if section 204 returns a positive response at 710/(810), subroutine SSCPSRH is called at 711/(811). It will necessarily return a positive response at this point. The reason for calling SSCPSRH is to obtain certain details about the resource, not relevant to the invention, which are not returned as a result of the simple directory search at step 708/(808).

If the IN search request came from a NN (FIG. 7), then an appropriate positive or negative response is returned at steps 712 or 714 and the IN search is ended. However, if the IN search request was from a LU located on the IN, the search is extended to the NN that serves this EN at step 816. This causes the search to be extended into the PPN network in accordance with the teaching of U.S. Pat. No. 4,914,571.

Figure 9B:
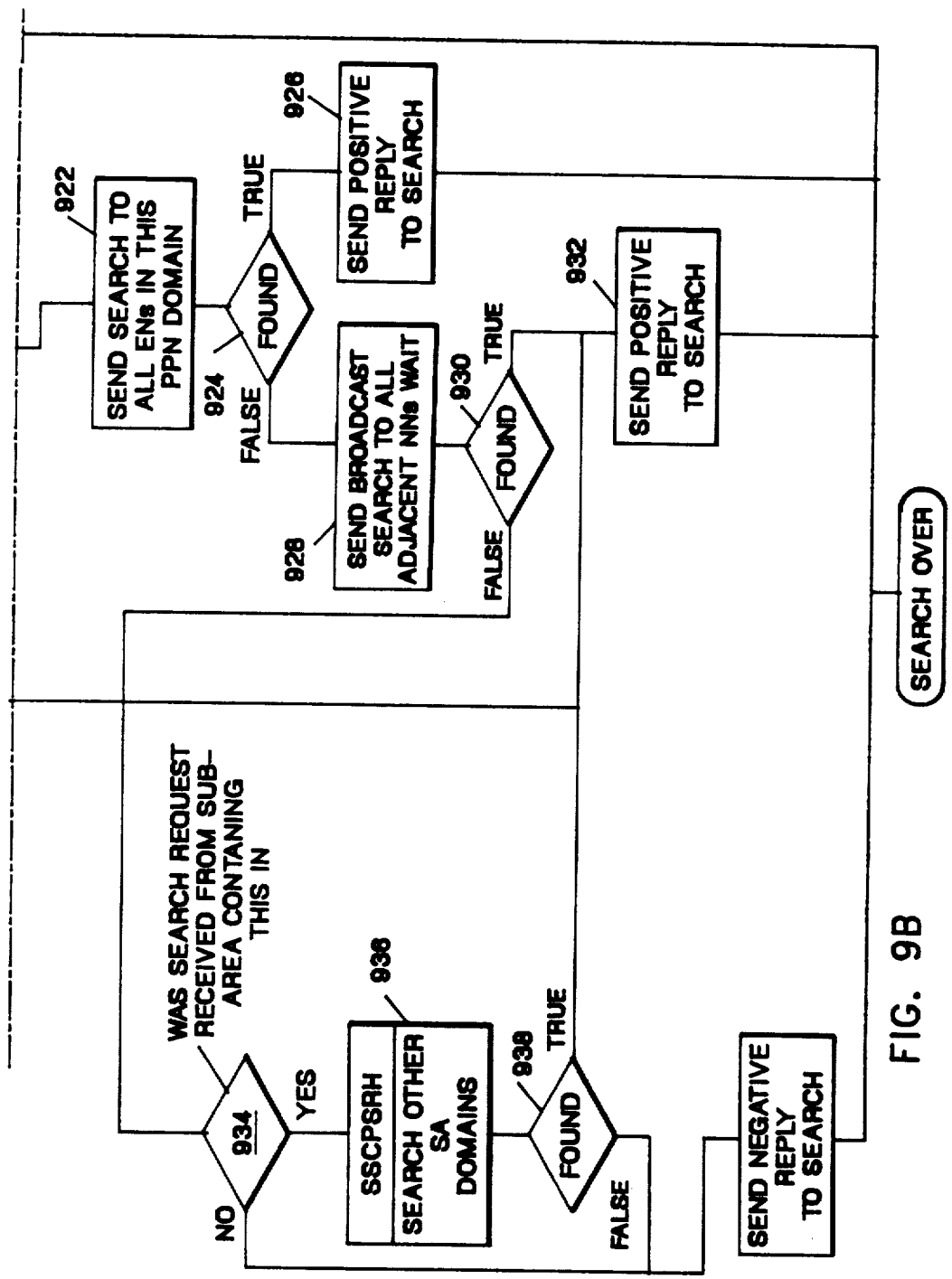

FIG. 9 shows the search routine FROM_SA that is executed in response to a search request received by the subarea section 204 from the subarea network 104. In a fashion similar to that of a search request received from the PPN side of the IN, SSCP 214 first determines at step 902 if the IN is implemented as an EN. If so, the subroutine SA_EN shown in FIG. 11 is executed. If the IN is not an EN, step 904 searches the domain directory 220 to locate the target resource. If the resource is found (step 906), a positive search response is transmitted at step 908 to the subarea node from which the request was received by section 204. In the case of a subarea network, this source of the request is determined by using the FQPCID control vector to locate a control block which contains a path route on which to send the response. The control block is established and the path route stored therein at the time of receipt of the search request. If the resource is not found in the domain local directory 220 at step 906, the subarea section 204 sends a search request via transform modules 222 to the PPN section 202. To avoid infinite search loops, the PPN section must determine if this search request from the subarea network 104 originally came from a search request that was earlier propagated from the PPN network 102 into the subarea network. This check for a circular search is necessary when the search request arrives at an IN from a subarea network because of the way that subarea searches are conducted, which is not within the control of the invention. To check for this circularity, the search request is interrogated at step 910 to determine if it contains an interexchange network support control vector (INSCV). If the vector is present, then the search originated in PPN network 102 or in some other PPN network (not shown) which is part of the combined network 100. If present, INSCV contains the name and network address of the IN that first routed the search request into the subarea network. Step 912 in the PPN section 202 determines whether or not the PPN network 102 has already been searched. The name of the IN through which the search request was passed to the subarea network 104 is taken from the interexchange node field of the search request and route selection services (described in U.S. Pat. Nos. 4,914,571 and 4,827,411) are used to determine if there is a route connection through the PPN between the IN receiving the search request from the subarea network and the IN identified in the interexchange node field. Route selection services uses the topology database described in U.S. Pat. No. 4,827,411 to determine the presence or absence of a route. If a route is found to exist, then step 912 does not propagate the search further and returns a negative search response at step 914. If a route does not exist, this implies that the search is not circular and it is extended further into the network 104. In this case, step 916 is executed to search the local and domain directories 213 and 212 of the PPN section of the IN. The search here is similar to that described elsewhere. If the resource is in the local directory 213 (step 917), the search is ended. If it is in the domain directory 212 (step 919), it is verified (step 918) with a directed search to the identified EN. If the resource is still not found, step 922 sends a search request to all of the EN's served by the PPN section 202. If none of the EN's returns a positive response, then step 928 transmits a broadcast search request to all of the adjacent NN's in network 102. The IN search is ended if any NN returns a positive response. If all of the NN nodes return negative responses, then the search may be further extended to other subareas in network 104. This depends on whether or not the search request that arrived at the subarea section 202 came from the same subarea domain that contains the IN. Step 934 determines this by examining the information contained in the search message received from section 204. If the answer is no, the search is terminated at the IN. The fact that another subarea domain other than that containing the IN has received the search request means that the other subarea domains of network 104 will automatically be searched as necessary according to the existing search procedures applicable to subarea networks. However, if the IN is in the same subarea domain as the node from which the IN received the search request, there is no guarantee that other domains will be searched. In this case, subroutine SSCPSRH is called at step 936 to search other subarea domains, if any. After SSCPSRH is completed, an appropriate positive or negative response is returned, depending on the search results of SSCPSRH.

As mentioned above, subroutine SA_EN is called by SSCP 214 at step 903 in response to a request from subarea network 104 if the IN is an EN. Step 1102 searches SSCP 214 domain directory 220. If the resource is not there (step 1104), SSCP 214 sends a search message via the transforms 222 to the PPN section 202. In response, step 1108 searches the directory 211. The domain directory 212 and cross-domain directory 215 are either not present or empty. If the resource is still not located (step 1110), step 1114 sends a search request to the NN that serves this EN (IN). The NN will search its own resources and may initiate broadcast searches to other NN's, if necessary, in accordance with the teaching of U.S. Pat. No. 4,914,571. In any event, eventually a response will be returned to the IN and an appropriate response is then returned to the source of the search request at the IN at steps 1116, 1118 and 1120.

It is to be understood that the above described arrangements are merely illustrative of the application of principles of the invention and that other arrangements may be devised by workers skilled in the art without departing from the spirit and scope of the invention.

I claim:

1. In a network system comprising at least two independent computing networks (102, 104) connected by at least one interface node (120, 122), which independent networks use different resource search methods and message formats, a method of extending a search for the location of a network system resource across a said interface node, in which a first one of the networks (102) comprises a plurality of network nodes (106-M) and end nodes (106-M-M), wherein the network nodes are interconnected nonhierarchically as peer nodes, each providing network services to a separate group of end nodes, and each network node dynamically maintains a directory (211) of resources in the first network as it becomes aware of such resources, and the second network comprises one or more interconnected subarea domains (108), each internally structured as a plurality of hierarchically connected nodes with a domain host node having a directory of all resources contained in the respective domain (212,213), the interface node being divided into a first section (202) associated with the first network, and a second section (204) associated with the second network, said second section being configured as a host node of a respective domain, the method comprising the steps at the interface node of initiating a search of the first and second networks for the resource according to steps a) through h), and terminating the search and returning a positive indication to the source of a search request if the resource is located, and returning a negative response if the resource is not located said method further comprising responsive to the arrival of a first search request at the first section of the interface node from the first network (FIG. 3), a) searching (406, 404; 510) the resource directory of the first section to determine if the location of the resource in the network system is known to the first section, b) if the resource is not listed in the directory of the first section, transforming (222) the first search request into a format required by the second section, said format requesting a search only of the directory of the second section of the interface node and transmitting (409; 516) the transformed first search request to the second section, and c) waiting (410; 518) for a response to the transformed first search request from the second section before proceeding with the search, and in response to the arrival of a second search request at the second section from the second network (FIG. 9), d) searching (904) the resource directory of the second section to determine if the location of the resource in the network system is known to the second section, e) if the resource is not listed in the directory of the second section, transforming (222) the second search request into a format required by the first section and transmitting the transformed second search request to the first section, in the first section in response to the transformed second search request, f) determining (910, 912) if the transformed second search request derives from another search request propagated from the first network into the second network, and if so, g) transmitting (914) a negative response to the second section, and h) otherwise, searching (916) the resource directory of the first section.

2. The method of claim 1 wherein the first search request is for either a broadcast search or a directed search, wherein a broadcast search implies an exhaustive search of the network system and a directed search implies a search of only the resources listed in the directory of the node receiving the search request, said method further comprising the step of if the first search request is for a broadcast search, transmitting (402) a third search request of the broadcast type to all network nodes in the first network connected to the first section, before performing step a).

3. The method of claim 2 further comprising the step of if the first search request is for a broadcast search and the resource is not found in the directories of the first and second sections of the interface node, transmitting (414) a fourth search request to each end node in the first network served by the first section of the interface node.

4. The method of claim 3 further comprising the step of if the response to each of the fourth search requests is negative, waiting for responses from all network nodes in the first network to the third search request, if each response to the third search request is negative, formulating and transmitting (424, FIG. 10) a fifth search request to the second section of the interface node to initiate an exhaustive search of the second network.

5. The method of claim 4 further comprising the steps of in response to the fifth search request, searching (1002) the domain directory of the second section of the interface node for the resource.

6. The method of claim 5 further comprising the step of if the resource is not found in the domain directory of the second section, sequentially transmitting (1014, 1016) a sixth search request to the host of each domain in the second network until a positive response is received or there are no further domains known to the second section.

7. The method of claim 2 further comprising the step of if the first search request (308) is a directed search request, determining (502) if the request is for a search of the interface node or of an end node served by the first section of the interface node, and, if the first search request is for a search of an end node served by the first section, transmitting (504) a third search request to the specified end node and waiting for the response to the third search request before performing step a).

8. The method of claim 7 further comprising the step of if the response to the third search request is negative, transmitting (516) a fourth search request from the first section to the second section to search the domain in which the second section is included, and waiting for a response to the fourth search request.

9. The method of claim 8 further comprising the step of if the response to the fourth search request is negative, transmitting (522) a fifth search request from the first section to all end nodes served by the first section, and waiting (524) for responses to all of the fifth search requests.

10. The method of claim 1 wherein the directory in the first section comprises a local directory (213) of resources located in the first section and a domain directory (212) of resources located at the end nodes served by the first section, and wherein step a) comprises searching (406) the local directory to determine if the resource is located in the first section, if the resource is not located in the first section, searching (404) the domain directory to see if the resource is listed as being owned by an end node served by the first section, if the resource is listed in the domain directory, verifying that the resource exists at the end node identified as owning the resource by sending (432) a third search message to the identified end node requesting a search only of the resources located in the identified end node, and waiting for a response to the third search message.

11. The method of claim 1 wherein the determining step f) comprises examining (910) the transformed second search request for the presence of a prescribed field identifying an interface node connecting the first and second networks, and if the prescribed field is present, determining (912) if a route exists in the first network between the interface node receiving the transformed second search request and the interface node identified in the prescribed field.

12. In a network system comprising at least two independent computing networks connected by at least one interface node, which independent networks use different resource search methods and message formats, apparatus for extending a search for the location of a network system resource across a said interface node, in which a first one of the networks comprises a plurality of network nodes and end nodes, wherein the network nodes are interconnected nonhierarchically as peer nodes, each providing network services to a separate group of end nodes, and each network node dynamically maintains a directory of resources in the first network as it becomes aware of such resources, and the second network comprises one or more interconnected subarea domains, each internally structured as a plurality of hierarchically connected nodes with a domain host node having a directory of all resources contained in the respective domain, the interface node being divided into a first section associated with the first network, and a second section associated with the second network, said second section being configured as a host node of a respective domain, said apparatus comprising means in each section for initiating a search of the first and second networks for the resource in response to a search request, and means for terminating the search and returning a positive indication to the source of the search request when the resource is located, said means for initiating a search further comprising first means responsive to the arrival of a first search request at the first section of the interface node from the first network for searching the resource directory of the first section to determine if the location of the resource in the network system is known to the first section, second means responsive to a negative result from the first means for transforming the first search request into a format required by the second section requesting a search only of the directory of the second section of the interface node and transmitting the transformed first search request to the second section, and third means for waiting for a response to the transformed first search request from the second section before proceeding with the search, and fourth means responsive to the arrival of a second search request at the second section from the second network for searching the resource directory of the second section to determine if the location of the resource in the network system is known to the second section, fifth means responsive to a negative result from the fourth means for transforming the second search request into a format required by the first section and transmitting the transformed second search request to the first section, sixth means in the first section responsive to the transformed second search request for determining if the transformed second search request derives from another search request propagated from the first network into the second network, seventh means responsive to a determination by the sixth means that the transformed second request derives from another search request for transmitting a negative response to the second section indicating that the resource was not found, and eight means responsive to a determination by the sixth means that the transformed second search request does not derive from another search request for searching the resource directory of the first section.

13. The apparatus of claim 12 wherein the first search request is for either a broadcast search or a directed search, wherein a broadcast search implies an exhaustive search of the network system and a directed search implies a search of only the resources listed in the directory of the node receiving the search request, said apparatus further comprising ninth means for determining if the first search request is for a broadcast search, tenth means responsive to a determination by the ninth means that the first search request is a broadcast search and operative before the first means for transmitting a third search request of the broadcast type to all network nodes in the first network connected to the first section.

14. The apparatus of claim 13 further comprising eleventh means responsive to a determination by the ninth means that the first search request is for a broadcast search and to a negative result of the search of the directories of the first and second sections of the interface node for transmitting a fourth search request to each end node in the first network served by the first section of the interface node.

15. The apparatus of claim 14 further comprising twelfth means responsive to a negative result from each of the fourth search requests for waiting for responses from all network nodes in the first network to the third search request, thirteenth means responsive to negative responses to each of the third search requests for formulating and transmitting a fifth search request to the second section of the interface node to initiate an exhaustive search of the second network.

16. The apparatus of claim 15 further comprising fourteenth means responsive to the fifth search request for searching the domain directory of the second section of the interface node for the resource.

17. The apparatus of claim 16 further comprising fifteenth means responsive to a negative result of the search by the fourteenth means for sequentially transmitting a sixth search request to the host of each domain in the second network until a positive response is received or there are no further domains known to the second section.

18. The apparatus of claim 13 further comprising
sixteenth means responsive to the first search request being a directed search request for determining if the request is for a search of the interface node or of an end node served by the first section of the interface node, and,
seventeenth means responsive to a determination by the sixteenth means that the first search request is for a search of an end node served by the first section and operative before the first means for transmitting a third search request to the specified end node and waiting for the response to the third search request.

19. The apparatus of claim 18 further comprising
eighteenth means responsive to a negative response to the third search request for transmitting a fourth search request from the first section to the second section to search the domain in which the second section is included, and
nineteenth means for waiting for a response to the fourth search request.

20. The apparatus of claim 19 further comprising
twentieth means responsive to a negative result to the fourth search request for transmitting a fifth search request from the first section to all end nodes served by the first section, and
twenty-first means for waiting for responses to all of the fifth search requests.

21. The apparatus of claim 12 wherein the directory in the first section comprises a local directory of resources located in the first section and a domain directory of resouces located at the end nodes served by the first section, and wherein the first means further comprises
ninth means for searching the local directory to determine if the resource is located in the first section,
tenth means responsive to a negative result from the ninth means for searching the domain directory to see if the resource is listed as being owned by an end node served by the first section,
eleventh means responsive to a positive result from the tenth means for verifying that the resource exists at the end node identified as owning the resource by sending a third search message to the identified end node requesting a search only of the resources located in the identified end node, and waiting for a response to the third search message.

22. The apparatus of claim 12 wherein the sixth means comprises
ninth means for examining the transformed second search request for the presence of a prescribed field identifying an interface node connecting the first and second networks, and,
tenth means responsive to a determination by the ninth means that the prescribed field exists for determining if a route exists in the first network between the interface node receiving the transformed second search request and the interface node identified in the prescribed field, and
eleventh means responsive to a determination by the tenth means that a route exists for returning a negative response to the transformed second request.

* * * * *